March 18, 1969     C. W. VETTE     3,434,038

DC CURRENT REGULATOR

Filed May 27, 1966

INVENTOR
CARL W. VETTE

BY *Hauke, Krass, & Gifford*

ATTORNEYS

United States Patent Office 3,434,038
Patented Mar. 18, 1969

3,434,038
DC CURRENT REGULATOR
Carl W. Vette, 17120 W. 10½ Mile Road,
Southfield, Mich. 01259
Filed May 27, 1966, Ser. No. 553,544
U.S. Cl. 323—4                                6 Claims
Int. Cl. G05f *1/10, 1/58;* H02j *1/04*

ABSTRACT OF THE DISCLOSURE

A solid state DC current regulator circuit which may be inserted serially between a load and a power supply. The current flows through a current-sensing resistance, the voltage developed being compared to that of a voltage reference diode by an error-sensing transistor. The error-sensing transistor drives a control transistor which varies the conduction of a regulator transistor used for adjusting the current flowing through the current-sensing resistance. The essentially constant base current of the regulator transistor operates the voltage reference diode. The regulator is temperature compensated, free of warmup drift and is capable of over-regulation.

---

The present invention relates to current regulators in general, and more particularly to a DC current regulator capable of compensating for voltage variations of a DC power supply and impedance changes in a load so as to provide a substantially constant through the load, the current regulator of the invention being further inherently compensated for the effect of ambient temperature changes.

The basic function of a non-generative current regulator device is to maintain a constant current flow in spite of wide variations in voltage applied to the current regulator. The changes in voltage applied to the current regulator may be caused by supply voltage fluctuations or load impedance changes or a combination of both effects. The current regulator is usually connected in series with a load, and in applications where solid state technology is utilized, prior art regulators often consist of a transistor having its emitter-collector circuit connected in series with the DC power supply and a current-sensing emitter resistor. The transistor is generally used as an emitter follower, the emitter voltage substantially varying proportionally to the base voltage which is supplied by a voltage reference. The voltage reference is provided generally by a forward biased diode having a termination connected to the base of the transistor. With such an arrangement, it is assumed that the forward voltage drop across the diode will remain constant with the emitter voltage being thus caused to remain constant. The voltage across the serially connected emitter resistance being constant, the current flowing through the emitter-collector circuit is therefore regulated.

Unfortunately, diodes generally have a forward voltage drop that increases as a function of the forward current therethrough, and are thus generally incapable of providing a constant voltage reference. In addition, diodes and transistors are, as is well known, rather sensitive to the effect of ambient temperature changes, and as a result, previous art current regulator are often unable to provide precise current regulation.

Those disadvantages of the previous art DC current regulators are remedied by the present invention which provides a novel current regulator capable of maintaining a current flow through a load within strict limits, in spite of wide supply voltage fluctuations and in spite of large ambient temperature changes.

It is, consequently, a principal object of the present invention to provide a DC current regulator substantially independent of supply voltage excursions and load impedance variations.

Another object of the invention is to provide a DC current regulation arrangement utilizing a few readily available simple semiconductor elements in an assembly providing a substantially constant current flow through a load in spite of variations of ambient temperature as a result of inherently including built-in temperature compensation.

It is a further object of the invention to provide a current regulator comprising a substantially constant reference voltage in spite of supply voltage variations.

It is yet another object of the invention to provide a current regulating solid state circuit capable of over-compensation by proper selection of some of the constitutive elements causing a decrease of current flow through the current regulator as a result of an increase of voltage applied across said current regulator, which may be a desirable operation for certain applications.

It is yet a further object of the invention to provide a DC current regulator wherein the regulator elements may be disposed in a parallel branch through which circulates only a fraction of the total current being regulated.

It is still another object of the invention to provide a DC current regulator of the character indicated which utilizes simple elements, which is easy to manufacture, which is low in cost, and which is superior in performance to similar prior art devices.

Other objects and advantages of the invention will become apparent when the following disclosure of the invention is considered in conjunction with the appended drawings wherein.

Figure 3:
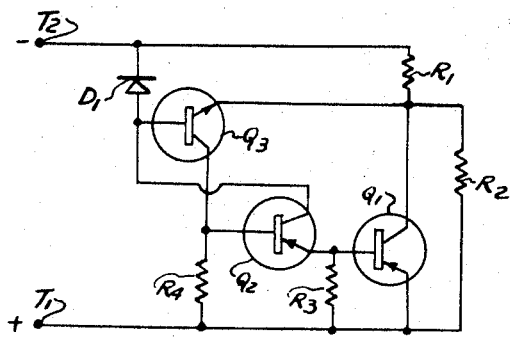
Figure 4:
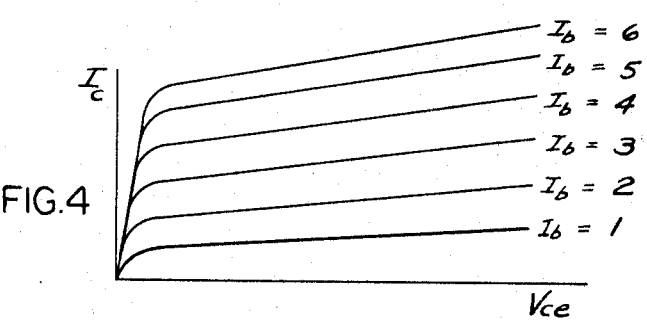
Figure 5:
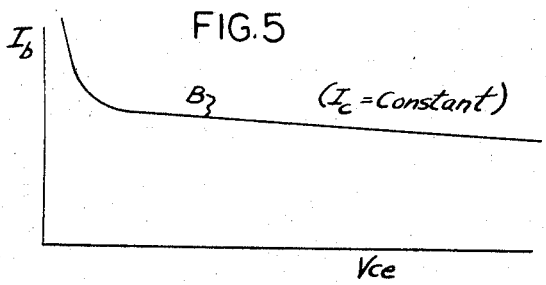

FIG. 3 is a schematic circuit diagram of an example of a DC current regulator according to the invention; and FIGS. 4–5 are graphs useful in explaining the operation of the circuit of FIG. 3, FIG. 4 representing a typical family of curves of transistor collector current versus collector voltage for diverse constant base currents, while FIG. 4 represents a transistor base current versus collector voltage curve, at constant collector current.

Although a current regulator device is usually connected serially with power supply and load so as to limit or regulate the current flowing in the circuit, the current regulator itself may comprise the load in applications where it is desired to have a constant current discharge from the power supply.

Furthermore, because it may be shown that, when a current regulator device is used serially with power supply and load, changes of supply voltage or changes in load impedance effect a changing voltage drop across the current regulator, the remainder of this specification omits the usual load resistance and concerns itself with the basic action of a current regulator device: i.e., to conduct a constant level of current despite large changes in voltage at the regulator terminals.

Figure 1:
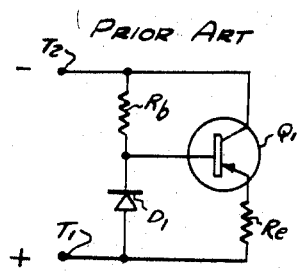
FIG. 1 is a schematic diagram of a previous art conventional regulator circuit.

Referring now to the drawings, and more particularly to FIG. 1 thereof, a prior art conventional DC current regulator placed across a DC power supply having positive terminal T1 and negative terminal T2, consists for example of a PNP transistor Q1 having is emitter-collector circuit in series with a current-sensing emitter resistor R*e*. A substantially constant reference voltage is provided by a voltage divider comprising a forward biased diode D1 in series with a resistor R*b* across the power supply, the common junction between the resistor R$b$ and the cathode of the diode D1 being connected to the base of transistor Q1 so as to provide a substantially constant bias voltage therefor. Transistor Q1 being utilized as an emitter follower, the voltage of its emitter varies in function of the voltage of its base. As long as the voltage of the base of transistor Q1 is maintained constant, it results that the voltage across emitter resistor R$e$ remains also constant. It follows, from Ohm's law, that the current flowing through emitter resistor R$e$ will remain substantially constant.

Figure 2:
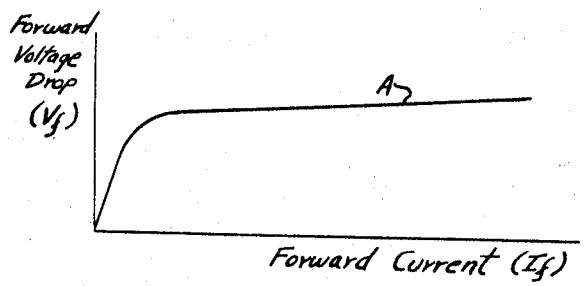
FIG. 2 is a graph representing the forward voltage drop across the diode used as part of the circuit of FIG. 1 as a function of the forward current flowing therethrough.

However, as shown in graph FIG. 2, the forward voltage drop V$f$ across the diode D1 in function of the value of forward current I$f$ flowing through the diode is according to curve A. It can be seen that, even for the portion of curve A in a straight almost horizontal line in the graph, there is a slight increase of forward voltage drop as a result of a much larger increase of forward current flowing therethrough. In the circuit of FIG. 1, the current flowing through diode D1 and R$b$ is substantially proportional to the input voltage across terminals T1 and T2 of the regulator. Consequently, a change or variation of the input voltage causes the reference voltage across diode D1 to vary. As a result, the bias voltage applied to the base of transistor Q1 varies and the current flowing through the emitter-collector circuit of the transistor also varies. In addition, there is a non-regulated current flow through the shunt circuit formed by series connected diode D1 and resistor R$b$, and this current component reduces the overall efficiency of the current regulator by creating a non-regulated circuit by-passing the regulator.

In order to limit circuit imbalance as a result of thermal influence upon the solid state elements included in the circuit, diode D1 is preferably chosen as being a silicon diode and transistor Q1 is preferably chosen as being a germanium transistor, so that the temperature coefficients of diode D1 and of the transistor Q1 base-to-emitter junction are nearly equal (approximately −2 mv. per degree centigrade), for the purpose of providing a constant voltage drop across resistor R$e$ as the ambient temperature changes. However, even though the temperature coefficients of diode D1 and transistor Q1 are about equal, the circuit of FIG. 1 has a thermally caused voltage drift across resistor R$e$ during warm-up. This voltage drift is caused by the greater power dissipation of transistor Q1 as compared to diode D1, resulting in transistor Q1 changing its temperature and base-to-emitter voltage drop at a different rate during warm-up than is the case for diode D1.

The disadvantages and performance limitations of the conventional DC current regulator of FIG. 1, resulting in poor current regulation and a changing current level during warm-up, are remedied by the improvement provided by the invention, an illustrative embodiment of which is shown schematically in FIG. 3. In FIG. 3, the regulator is connected across a power supply by having one end connected, for example, to the positive terminal T1 of the power supply and its other end connected to the negative terminal T2 thereof through the emitter-collector circuit of a PNP regulator transistor Q1 and a series disposed current-sensing resistor R1. The base of transistor Q1 is connected to the emitter of another PNP transistor Q2, the collector of which is connected to the anode of the forward-biased voltage reference diode D1. The base of NPN transistor Q3 is biased by way of diode D1 being connected across its base and the negative terminal T2 of the power supply. The emitter of transistor Q3 is connected to the termination of current-sensing resistor R1 and the collector of transistor Q1. A shunt resistor R3 is placed between the emitter of transistor Q2 and the emitter of transistor Q1 to act as a leakage current by-pass for the collector-to-base leakage of transistor Q1 and for the current leakage of the emitter of transistor Q2. Shunt resistor R3 also aids in establishing a minimum current flow through diode D1 via transistor Q2. A second shunt resistor R4 is connected between the collector of transistor Q3 and the emitter of transistor Q1 to establish a leakage current by-pass for the leakage current in the collector-to-base circuit of transistor Q2 and for the leakage current in the collector circuit of transistor Q3. In addition, resistor R4 aids in establishing a constant collector current for transistor Q3 so as to cause the base current of transistor Q3 to remain also constant for reasons to be later explained.

A resistor R2 may be connected as a shunt across the emitter-collector circuit of regulator transistor Q1 for the purpose, as will be hereinafter explained in further detail, of providing some predetermined improvement in the operation of the circuit according to the invention. However, for certain applications, as will be presently explained, resistor R2 may be omitted.

In the circuit of FIG. 3, diode D1 establishes a voltage reference applied to the base of transistor Q3 which is arranged to behave as an error-sensing element. The current flowing through the emitter-collector circuit of regulator transistor Q1 and through current-sensing resistor R1 causes a voltage drop across resistor R1. When the current flow across current-sensing resistor R1 tends to increase, the voltage drop thereacross also tends to increase, and the voltage at the emitter terminal of transistor Q3 also tends to increase. Consequently, as diode D1 establishes a substantially constant voltage reference for the base of transistor Q3, the forward bias across the base-emitter circuit of transistor Q3 tends to decrease as a result of the increase in emitter voltage. This in turn results in a decrease of the collector current of transistor Q3 supplying the base of control transistor Q2 which in turn reduces the base current supplied to regulator transistor Q1. Consequently, there is a resulting decrease in emitter-collector current through transistor Q1 which decreases the current flow through the regulator to the original current level.

It should be particularly noticed that the base current of transistor Q1, which flows through the emitter-collector circuit of transistor Q2, also flows through diode D1.

As shown in the graph of FIG. 4, which represents a typical family of collector characteristics for transistors such as transistor Q1, for constant base currents I$b$ the collector current I$c$ increases only slightly in function of the collector voltage V$ce$ when operating at the straight portions of the curves. FIG. 5 represents a graph wherein is plotted, for a constant collector current I$c$, a curve B representing the base current requirement I$b$, which remains essentially constant over wide variations of collector voltages V$ce$. As, in the circuit of FIG. 3, the base current I$b$ of regulator transistor Q1 flows also through diode D1, as long as the current flow through diode D1 is held substantially constant, a substantially accurate voltage reference for the error-sensing transistor Q3 is thus being achieved.

However, the graph of FIG. 5 also shows that as the voltage V$ce$ applied across the emitter-collector circuit of transistor Q1 increases, somewhat less base current I$b$ is required by the transistor; consequently, the voltage reference obtained through diode D1 varies slightly and inversely to the voltage variations applied across the emitter-collector circuit of tarnsistor Q1.

As a result of this decrease in reference voltage, the level of regulated current also decreases slightly compared to what would otherwise be the case. Normally the lack of perfect current regulation of the regulator results in the regulated current increasing slightly with increasingly applied voltage. The foregoing explained effected change in reference voltage across diode D1 serves to increase the effectiveness of the regulator.

This beneficial change in the reference voltage may be accentuated by the addition of resistor R2. At higher applied voltages to the regulator, R2 can be chosen to conduct a substantial proportion of the current flowing through R1. With transistor Q1 supplying a lesser amount of current than at lower voltages, the decreased base current requirement of transistor Q1 causes the reference diode D1 to assume an even lower voltage. A proper value of R2 can result in near-perfect compensation.

If the value of R2 is selected such that most of the current flowing through current-sensing resistor R1 flows through resistor R2, the circuit can become somewhat overcompensated so as to provide a negative resistance characteristic. Consequently, with increases in voltage across terminals T1 and T2, the current flowing through the current regulator may be designed to decrease. For some circuit applications, such current versus voltage capabilities may be found desirable.

A secondary function of resistor R2 is to decrease the power dissipation requirement of transistors Q1 and Q2, in view of the fact that, at the design maximum of applied voltage across terminals T1 and T2 of the regulator, R2 can be selected such as being capable of conducting a substantial amount of the total current through the regulator while a small amount of the total regulated current is caused to circulate through the emitter-collector circuit of transistor Q1.

As previously mentioned, resistor R4 aids in establishing a constant collector current for transistor Q3 so that the resultant base current of transistor Q3 is substantially constant, the base-to-emitter voltage drop of transistor Q3 being partly dependent on the level of its base current. Resistor R4 normally conducts a relatively constant current because it is connected across the relatively constant voltage drops of the base-to-emitter junctions of both transistors Q2 and Q1.

By proper choice of the constitutive elements, the current regulator circuit of FIG. 3 is inherently temperature compensated. The diode D1 is preferably a forward-biased silicon diode, and the transistor Q3 is preferably a germanium transistor, so that the temperature coefficients of diode D1 and transistor Q3 very nearly balance each other. The power dissipated by transistor Q3 is not sufficient to cause other than negligible temperature differentials between diode D1 and the transistor, even during warm-up so that both diode D1 and transistor Q3 remain at essentially ambient temperature.

It is evident that PNP transistors Q1 and Q2 may be replaced by NPN transistors and that NPN transistor Q3 may be replaced by a PNP transistor, on the condition that the polarity of the power supply be inverted and that diode D1 be reversed with respect to the polarity in which it is connected in the circuit diagram of FIG. 3.

The invention thus provides an improvement over conventional DC current regulation means which is capable of providing a regulated substantially constant current irrespective of voltage variations across the regulator due to power supply instability or load impedance variations, while providing nearly perfect temperature compensation without circuit complication. It will be apparent to those skilled in the art that many modifications and omissions are possible without departing from the spirit and scope of the invention as expressed in the appended claims.

What is claimed as new is:

1. In a DC current regulator of the type employing a regulator transistor, a current-sensing resistor connected in series with the emitter-collector circuit of said regulator transistor and a diode operative to provide a reference voltage for comparison with the voltage across the current-sensing resistor, the improvement which consists of circuitry for stabilizing the current flow through said diode by serially connecting said diode in the base circuit of said transistor, so that the base current of said transistor flows through said diode.

2. The improvement of claim 1 in combination with an impedance shunting the collector-emitter circuit of said transistor whereby an inverse current relationship is established between said impedance and said diode.

3. A DC current regulator comprising: a regulator first transistor, a current-sensing first resistor in series with the collector-emitter circuit of said first transistor, a second transistor having its emitter connected to the junction of a terminal of said current-sensing resistor and the collector of said first transistor, a diode connected between the base of said second transistor and the other terminal of said current-sensing resistor, a third transistor having its base and its collector connected respectively to the collector and to the base of said second transistor and its emitter connected to the base of said first transistor, and second and third resistors connected between the emitter of said first transistor and respectively the bases of said first and of said third transistors.

4. The current regulator of claim 3 in combination with a fourth resistor shunting the collector-emitter circuit of said first transistor whereby an inverse current relationship is established between said fourth resistor and said diode.

5. The current regulator of claim 3 wherein said diode is a forward biased silicon diode and said second transistor is of germanium construction, said diode and said second transistor having substantially the same temperature coefficients.

6. The current regulator of claim 3 wherein said first and third transistors are of the same polarity type and said second transistor is of an opposite polarity type.

References Cited

UNITED STATES PATENTS

| 2,832,035 | 4/1958 | Bruck et al. | 323—22 |
| 3,114,872 | 12/1963 | Allard | 323—4 |
| 3,158,800 | 11/1964 | McPhearson | 323—22 |
| 3,246,233 | 4/1966 | Herz | 323—4 |
| 3,255,402 | 6/1966 | Vollnhals | 323—9 X |

JOHN F. COUCH, *Primary Examiner.*

A. D. PELLINEN, *Assistant Examiner.*

U.S. Cl. X.R.

323—38